US012663561B2

(12) United States Patent
Lai et al.

(10) Patent No.: US 12,663,561 B2
(45) Date of Patent: *Jun. 23, 2026

(54) NANOSTRUCTURE-INTEGRATED LENS FOR INFRARED LIGHT IMAGING

(71) Applicant: Hong Kong Applied Science and Technology Research Institute Co., Ltd., Shatin (HK)

(72) Inventors: Yunhe Lai, Shatin (HK); Ying Suet Lau, Kwai Tsing (HK); Qingyi Yang, Shatin (HK); Jinbo Jiang, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 361 days.

This patent is subject to a terminal disclaimer.

(21) Appl. No.: 18/448,619

(22) Filed: Aug. 11, 2023

(65) Prior Publication Data

US 2023/0384481 A1     Nov. 30, 2023

Related U.S. Application Data

(63) Continuation-in-part of application No. 17/746,508, filed on May 17, 2022, now Pat. No. 12,298,469.

(51) Int. Cl.
*G02B 1/00*          (2006.01)
*G02B 3/02*          (2006.01)

(52) U.S. Cl.
CPC .............. G02B 1/002 (2013.01); G02B 3/02 (2013.01); *G02B 2207/101* (2013.01)

(58) Field of Classification Search
CPC .......... G02B 1/00; G02B 1/002; G02B 1/005; G02B 1/007; G02B 1/18; G02B 27/0012;
(Continued)

(56) References Cited

U.S. PATENT DOCUMENTS

| | | | |
|---|---|---|---|
| 9,092,090 B2 | 7/2015 | Zhang et al. | |
| 9,360,935 B2 | 6/2016 | Chan et al. | |

(Continued)

FOREIGN PATENT DOCUMENTS

| CN | 205562413 U | 9/2016 |
|---|---|---|
| CN | 106094066 A † | 11/2016 |

(Continued)

OTHER PUBLICATIONS

Patent Cooperation Treaty, International Search Report and Written Opinion issued for PCT Application No. PCT/CN2023/116061, dated May 9, 2024, 8 pages.
(Continued)

*Primary Examiner* — Sultan Chowdhury
(74) *Attorney, Agent, or Firm* — Norton Rose Fulbright US LLP

(57)          ABSTRACT

Systems and methods which provide single nanostructure-integrated metalens configurations implementing light focusing functionality are described. A single nanostructure-integrated metalens may comprise an optical substrate having a preconfigured mapping of integrated nanostructures providing metasurfaces for modulating the behaviors of electromagnetic waves to implement a thin, flat lens. A period distance for the nanostructures, a height of the nanostructures, and a quantization for lateral sizes of the nanostructures may be selected for a particular single nano-structure-integrated metalens configuration. One or more phase maps configured for light focusing may be computed with respect to one or more design wavelengths selected for focusing. The consolidated phase retardation requirements of the one ore more phase maps may be satisfied by a preconfigured mapping which defines the phase distribution for the nanostructures of a single nanostructure-integrated metalens implementation.

20 Claims, 6 Drawing Sheets

(58) Field of Classification Search

CPC  G02B 27/0938; G02B 27/0944; G02B 27/20; G02B 27/30; G02B 27/425; G02B 27/1086; G02B 27/4205; G02B 27/4233; G02B 27/4266; G02B 27/4272; G02B 27/4288; G02B 2207/00; G02B 2207/101; G01B 11/22; G01B 11/24; G01B 11/25; G01B 11/2509; G01B 11/2513; G01B 11/2527; G01B 11/2531; G01B 11/2536; G01B 11/2545

See application file for complete search history.

(56)  References Cited

U.S. PATENT DOCUMENTS

| | | | |
|---|---|---|---|
| 9,857,919 | B2 | 1/2018 | Zhang |
| 9,970,884 | B1 | 5/2018 | Nikitin et al. |
| 10,148,941 | B2 | 12/2018 | Shpunt et al. |
| 10,378,887 | B2 | 8/2019 | Na et al. |
| 10,408,419 | B2 | 9/2019 | Aieta et al. |
| 10,564,716 | B2 | 2/2020 | Zhang et al. |
| 10,887,500 | B2 | 1/2021 | Wu et al. |
| 10,971,900 | B2 | 4/2021 | Wang et al. |
| 11,085,609 | B1 | 8/2021 | Cheng |
| 11,092,717 | B2 | 8/2021 | Capasso et al. |
| 11,092,727 | B2 | 8/2021 | Smith et al. |
| 11,333,614 | B2 | 5/2022 | Chen et al. |
| 11,431,881 | B2 | 8/2022 | Taylor et al. |
| 11,543,564 | B2 | 1/2023 | Chen et al. |
| 2013/0208273 | A1 | 8/2013 | Dominguez-Caballero et al. |
| 2015/0193978 | A1 | 7/2015 | Wu et al. |
| 2017/0082263 | A1* | 3/2017 | Byrnes ................... B82Y 20/00 |
| 2018/0216797 | A1 | 8/2018 | Khorasaninejad et al. |
| 2018/0224574 | A1* | 8/2018 | Lee ...................... C23C 14/5806 |
| 2019/0033683 | A1 | 1/2019 | Ahmed et al. |
| 2019/0049632 | A1 | 2/2019 | Shin et al. |
| 2019/0137665 | A1 | 5/2019 | You et al. |
| 2019/0139243 | A1* | 5/2019 | You ........................ H04N 13/25 |
| 2019/0154877 | A1 | 5/2019 | Capasso et al. |
| 2019/0383969 | A1 | 12/2019 | Badano et al. |
| 2020/0004036 | A1 | 1/2020 | Sales et al. |
| 2020/0025985 | A1 | 1/2020 | Teissier et al. |
| 2020/0201061 | A1 | 6/2020 | Mor |
| 2020/0225386 | A1 | 7/2020 | Tsai et al. |
| 2020/0264343 | A1* | 8/2020 | Han ......................... G02B 1/14 |
| 2020/0393599 | A1 | 12/2020 | Fu et al. |
| 2021/0068665 | A1 | 3/2021 | Pahlevaninezhad et al. |
| 2021/0149081 | A1 | 5/2021 | Groever et al. |
| 2021/0247549 | A1 | 8/2021 | Park et al. |
| 2021/0286189 | A1 | 9/2021 | Ghosh et al. |
| 2021/0311379 | A1 | 10/2021 | Park et al. |
| 2021/0318516 | A1 | 10/2021 | Han et al. |
| 2022/0011161 | A1 | 1/2022 | Han et al. |
| 2022/0048764 | A1 | 2/2022 | Chen et al. |
| 2022/0078318 | A1 | 3/2022 | Wang et al. |
| 2022/0082731 | A1 | 3/2022 | Mun et al. |
| 2022/0086319 | A1 | 3/2022 | Yen |
| 2022/0137226 | A1 | 5/2022 | Kim et al. |
| 2022/0196480 | A1 | 6/2022 | Ang et al. |
| 2022/0225386 | A1 | 7/2022 | Salah |
| 2022/0228918 | A1 | 7/2022 | Busnaina et al. |
| 2022/0252761 | A1 | 8/2022 | Xia et al. |
| 2022/0260754 | A1 | 8/2022 | Dobashi |
| 2022/0360698 | A1 | 11/2022 | Taylor et al. |

FOREIGN PATENT DOCUMENTS

| | | |
|---|---|---|
| CN | 107703579 A | 2/2018 |
| CN | 108291983 A | 7/2018 |
| CN | 109196387 A | 1/2019 |
| CN | 110609386 A | 12/2019 |
| CN | 112505808 A | 3/2021 |
| CN | 112558293 A | 3/2021 |
| CN | 112684522 A | 4/2021 |
| CN | 111722392 B | 6/2021 |
| CN | 113258428 A | 8/2021 |
| CN | 113296381 A | 8/2021 |
| CN | 214098104 U | 8/2021 |
| CN | 113671613 A | 11/2021 |
| CN | 113809553 A | 12/2021 |
| CN | 215005942 U | 12/2021 |
| CN | 113917578 A | 1/2022 |
| CN | 114002768 A | 2/2022 |
| CN | 114072646 A | 2/2022 |
| CN | 114280703 A | 4/2022 |
| CN | 114449139 A | 5/2022 |
| CN | 115136035 A | 9/2022 |
| CN | 217467355 U | 9/2022 |
| CN | 217639611 U | 10/2022 |
| CN | 217639612 U | 10/2022 |
| CN | 217639613 U | 10/2022 |
| CN | 217820839 U | 11/2022 |
| CN | 217821058 U | 11/2022 |
| CN | 217982120 U | 12/2022 |
| EP | 3968059 A1 | 3/2022 |
| EP | 3980838 A1 | 4/2022 |
| KR | 10-20210006842 A | 1/2021 |
| KR | 102262913 B1 | 6/2021 |
| KR | 10-20210128927 A | 10/2021 |
| KR | 10-20220104507 A | 7/2022 |
| KR | 10-20220138933 A | 10/2022 |
| WO | WO-2018204856 A1 | 11/2018 |
| WO | WO-2021212811 A1 | 10/2021 |
| WO | WO-2021233416 A1 | 11/2021 |
| WO | WO-2021233831 A1 | 11/2021 |
| WO | WO-2022007738 A1 | 1/2022 |
| WO | WO-2022051971 A1 | 3/2022 |
| WO | WO-2022170048 A2 | 8/2022 |
| WO | WO-2022183094 A1 | 9/2022 |
| WO | WO-2022228231 A1 | 11/2022 |
| WO | WO-2022235826 A2 | 11/2022 |
| WO | WO-2022263259 A1 | 12/2022 |
| WO | WO-2022263296 A1 | 12/2022 |
| WO | WO-2023283270 A1 | 1/2023 |
| WO | WO-2023283348 A1 | 1/2023 |

OTHER PUBLICATIONS

Lee, G.Y.; Hong, J.Y.; Hwang, S.; Moon, S.; Kang, H.; Jeon, S.; Kim, H.; Jeong, J.-H.; Lee, B. Metasurface eyepiece for augmented reality. *Nat. Commun.* 2018, 9, 4562.

Li, Z.; Lin, P.; Huang, Y.W.; Park, J.S.; Chen, W.T.; Shi, Z.; Qiu, C.-W.; Cheng, J.-X.; Capasso, F. Meta-optics achieves RGB-achromatic focusing for virtual reality. *Sci. Adv.* 2021, 7, eabe4458.

L. Li, Z. Liu, X. Ren, S. Wang, V.-C. Su, M.-K. Chen, C.H. Chu, H.Y. Kuo, B. Liu, W. Zang, et al. Metalens-array-based high-dimensional and multiphoton quantum source. *Science* 2020, 368, 1487-1490.

Patent Cooperation Treaty, International Search Report and Written Opinion issued for PCT Application No. PCT/CN2022/095158, dated Feb. 16, 2023, 9 pages.

China National Intellectual Property Administration, First Office Action issued for Chinese Patent Application No. 202280002164.0, dated Jun. 30, 2023, 11 pages.

China National Intellectual Property Administration, Second Office Action issued for Chinese Patent Application No. 202280002164.0, dated Sep. 8, 2023, 12 pages.

Gerchberg, R. W. et al. "A Practical Algorithm for the Determination of Phase from Image and Diffraction Plane Pictures," Optik, vol. 35, No. 2, 1972, 6 pages.

\* cited by examiner
† cited by third party 112h
112g
112f
112e
112d
112c
112b
112a

111

NANOSTRUCTURE-INTEGRATED LENS FOR INFRARED LIGHT IMAGING

CROSS-REFERENCE TO RELATED APPLICATION

This application is a continuation-in-part of U.S. patent application Ser. No. 17/746,508, titled "SINGLE NANO-STRUCTURE-INTEGRATED METALENS," filed May 17, 2022, the disclosure of which is incorporated herein by reference in its entirety.

TECHNICAL FIELD

The present disclosure relates generally to optical lenses and, more specifically, to single nanostructure-integrated metalens configurations.

BACKGROUND

Various forms of optical sensors, such as for use in imaging, ranging, depth detection, etc., have entered into relatively widespread use. For example, optical sensors using a semiconductor-based sensor array (e.g., image detector array, photodetector array, image capture array, etc.) have been increasingly used in mobile devices. Mobile devices, such as smartphones, tablet devices, notebook computers, and even smartwatches, often include semiconductor-based optical sensor devices in the form of one or more cameras. Additionally, such mobile devices often include some form of semiconductor-based optical sensor device for light detection and ranging (e.g., using light detection and ranging (LiDAR) for face scanning and/or other depth mapping tasks).

For some applications, semiconductor-based optical sensor devices designed for imaging by detecting light of the infrared (IR) spectrum are utilized. Semiconductor-based optical sensor devices used for IR imaging applications generally include sensor array(s) configured to detect light within one or more IR sub-spectrum. Semiconductor-based optical sensor devices that support imaging within only a single IR sub-spectrum are most common because sensor arrays configured for detection of wavelengths spanning no more than one IR sub-spectrum are less complex to design and fabricate than sensor arrays configured for detection of wavelengths spanning multiple IR sub-spectrums. Examples of IR imaging applications include: thermal cameras, which typically utilize devices for imaging within at least the long-wave IR (LWIR) sub-spectrum (i.e., wavelengths of approximately 8 μm-14 μm); gas analysis systems, which typically utilize devices for imaging within at least the mid-wave IR (MWIR) sub-spectrum (i.e., wavelengths of approximately 3 μm-5 μm); and security imaging systems as well as 3D sensing systems, which typically utilize devices for imaging within at least the near IR (NIR) sub-spectrum (i.e., wavelengths of approximately 780 nm-2500 nm).

A goal in the implementation of semiconductor-based optical sensor devices for imaging in any spectrum is often miniaturization, particularly when the implementation is with respect to devices intended for handheld use which are designed for portability. It is difficult, however, to reduce the thickness of optical sensor devices. For example, optical lenses for light focusing are traditionally included in optical sensor devices used for imaging applications, wherein the optical lens is used to focus incident light onto the optical sensor device. In such systems, the curvature of the lens controls the optical performance of the optical sensor device.

The refractive power of the lens decreases as the radius of curvature of the lens increases and, correspondingly, the refractive power of the lens increases as the radius of curvature decreases. This is because the thickness of the lens in an optical axis direction increases as the radius of curvature decreases. Miniaturization of an optical sensor device utilizing such a lens is, thus, subject to the thickness of the lens for providing the necessary optical performance.

In recent years, diffractive optical elements (DOEs), in which micro structured surface relief patterns cause light diffraction, have begun to be adopted for use with respect to optical sensor devices (e.g., for providing light focusing with respect to optical sensor devices). A DOE is comprised of a thin plate having micro-optic diffractive structures disposed in a predetermined mapping thereon configured to impose a certain spatial pattern of optical phase changes on an incident light beam. The micro-optic diffractive structures of a DOE modify the phase of incident light with the height of the structures (e.g., the thicker the material is forming a micro-optic diffractive structure, the larger the phase rotation provided by that micro-optic diffractive structure). This aspect of DOE implementations results in high costs (e.g., requires multiple fabrication steps to achieve the different structure heights) to achieve higher phase levels.

Metalens configurations, in which metasurfaces modulate the behaviors of electromagnetic waves and increase the effective optical path by the optical resonance of the nano-structures, have begun to receive attention for use as light focusing devices with respect to optical sensor devices used for imaging applications. Such optical sensor devices configured for light detection from within one or more IR sub-spectrum often include sensor arrays capable of detecting not just one wavelength of light from within the supported sub-spectrum, but a plurality of wavelengths from within the supported sub-spectrum. Therefore, in order to support the capabilities of the sensor arrays of an optical sensor device as fully as possible, metalens configurations are often utilized to focus a range of wavelengths of light as opposed to just a single wavelength of light. However, generally, the light focusing quality of a single metalens is poorer the further displaced a wavelength to be focused is from a center wavelength for which the metalens is designed. As a method for widening the range of wavelengths for which an optical sensor device may provide higher quality focusing support, existing metalens configurations often include a plurality of lenses, either a series of metalenses or a mixture of metalenses and conventional lenses. However, the use of more than one lens increases the overall thickness of the optical sensor device and presents a limitation on miniaturization. Further, even to the extent that existing metalens configurations including a plurality of lenses support light focusing for more than one wavelength of light, the range of supported wavelengths is typically of relatively narrowband (e.g., a range of 1 μm or less) because designing support for wider band wavelength ranges into a metalens configuration generally increases the design and fabrication complexity for the configuration substantially. Additionally, metalens configurations considered for light focusing in imaging applications have typically provided configurations in which the nanostructures are easily damaged, such as through their being exposed externally to the lens system.

An example of a metalens configuration proposed for imaging is described in United States patent publication US20220082731. In metalens embodiments of US20220082731, more than one metalens is used to focus light onto an image sensor, limiting the extent of miniaturization possible for the embodiment. Further, some metalens configurations of US20220082731 provide for the nanostructures to be included on the outward facing side of the metalenses, decreasing the durability of the resulting metalenses in the configuration.

International patent publication WO2022051971 also describes an example of a metalens configuration proposed for imaging. In metalens embodiments of WO2022051971, conventional lenses are used in addition to at least one metalens to focus light, limiting the extent of miniaturization possible for the embodiment. Further, the metalens embodiments of WO2022051971 support light focusing for no more than approximately a 1 µm band of wavelengths.

SUMMARY

The present invention is directed to systems and methods which provide single nanostructure-integrated metalens configurations. In accordance with embodiments of the invention, a single metalens provides light focusing functionality, such as for infrared (IR) wavelengths. For example, a single metalens of some examples may be configured to provide light focusing functionality for a plurality of wavelengths within the IR spectrum.

A single nanostructure-integrated metalens configuration of embodiments comprises an optical substrate having a preconfigured mapping of integrated nanostructures providing metasurfaces for modulating the behaviors of electromagnetic waves to implement a thin, flat lens. In accordance with some examples, single nanostructure-integrated metalens configurations may provide a range of supported focal distances and relatively wide fields of view. Implementations of a single nanostructure-integrated metalens of embodiments of the invention are well suited for use in various optical sensor devices. For example, a single nanostructure-integrated metalens according to concepts herein may be utilized within a thermal imaging sensor, as a device for focusing wavelengths of light from within the long-wave IR (LWIR) sub-spectrum onto a sensor array included within the thermal imaging sensor. A single nanostructure-integrated metalens configuration for light focusing according to concepts herein may provide for greater levels miniaturization than that of existing light focusing lens configurations, making such metalens configuration a desirable focusing solution for handheld thermal imaging sensors for which portability is a concern. According to embodiments, a single nanostructure-integrated metalens configuration may be utilized to focus light comprising a single IR wavelength, a narrowband range of IR wavelengths (e.g., 1 µm or less), or a wideband range of IR wavelengths (e.g., a range of up to 6 µm), allowing the single nanostructure-integrated metalens to support the detection range of an sensor array included within a thermal imaging sensor as fully as possible. Further, wideband ranges of IR wavelengths or narrowband ranges of IR wavelengths focused by a single nanostructure-integrated metalens of embodiments herein may span no more than a single IR sub-spectrum or may span multiple IR sub-spectrums. Additionally, a single nanostructure-integrated metalens for light focusing according to concepts herein may provide focusing for incident light within a wide field of view, allowing the single nanostructure-integrated metalens to support imaging a greater expanse of on an object plane by just a single thermal imaging sensor.

Various corporeal aspects with respect to the nanostructure for a single nanostructure-integrated metalens configuration may be selected. For example, a form of nanostructure (e.g., one or more forms of nanostructures, such as nano cube, nano cuboid, nano cylinder, nano elliptic cylinder, etc.) may be selected for use with respect to a particular single nanostructure-integrated metalens. Additionally or alternatively, a period distance for the nanostructures (e.g., a center distance with respect to adjacent nanostructures such that adjacent nanostructures are spaced according to the period distance), a height of the nanostructures, and a lateral size of the nanostructures may be selected for a particular single nanostructure-integrated metalens configuration. In accordance with some examples, the period distance may be selected based at least in part on the center wavelength of the single nanostructure-integrated metalens. The period distance for the nanostructures may additionally be selected according to some examples based upon considerations such as the flexibility of the phase design, the field of vision, the fabrication difficulty, etc. The height of the nanostructures may be selected based at least in part on the center wavelength of the single nanostructure-integrated metalens, wherein all nanostructures of a single nanostructure-integrated metalens implementation have a same height according to some embodiments. Lateral size of the nanostructures of embodiments may be selected as a plurality of quantized lateral sizes for the nanostructures (e.g., 2, 4, 6, 8, 12, 16, etc. different lateral sizes, corresponding to the number of phase levels to be implemented), wherein the period distance for the nanostructures of some examples provides an upper boundary on the lateral size of the nanostructures. Uniformity of period distance, nanostructure height, and nanostructure form, as well as quantization of nanostructure lateral size are all factors that contribute to reduction of fabrication complexity for a single nanostructure-integrated metalens.

A configuration of nanostructures on a single nanostructure-integrated metalens may be determined according to a phase distribution of a preconfigured mapping designed so as to satisfy phase maps configured for focusing wavelengths of light. The preconfigured mapping may satisfy a single phase map or a plurality of phase maps. Phase maps for light focusing may be determined using empirical methods, numerical calculations, or a combination thereof. For example, determining phase maps using empirical methods may include designing and fabricating a single nanostructure-integrated metalens having a first configuration of nanostructures, measuring the phase distribution of the first configuration of nanostructures, adjusting the design based on the phase distribution of the first configuration, fabricating a single nanostructure-integrated metalens having a second configuration of nanostructures based on the adjusted design, and continuing this process until reaching a desired phase distribution. Additionally, examples of numerical calculations for determining phase maps for light focusing include but are not limited to binary diffractive phase functions (e.g., Binary2 lens phase function).

Single nanostructure-integrated metalens configurations of embodiments may be implemented in a variety of optical sensor devices. According to some examples, an imaging implementation may comprise an apparatus having a single nanostructure-integrated metalens for the focusing of light having wavelengths within the IR spectrum. The phase distribution of the single nanostructure-integrated metalens may satisfy a plurality of light focusing phase maps corresponding to a plurality of design wavelengths from within the IR spectrum. According to some embodiments, the design wavelengths may be from within a range restricted to a single IR sub-spectrum or may span multiple IR sub-spectrums. Because the phase distribution of the single nanostructure-integrated metalens may satisfy light focusing phase maps for a plurality of wavelengths, embodiments may support higher quality light focusing over wideband IR wavelength ranges while utilizing no additional optical elements (e.g., additional metalens (es), traditional lens(es), collimator(s), concentrator(s), mirror(s), etc.) in association with the single nanostructure-integrated metalens, facilitating a short total track length with respect to the apparatus and a lower number and cost of components in the apparatus. The apparatus may, for example, comprise a sensor array having a matrix of pixels configured to detect light from within a wavelength range encompassing the plurality of wavelengths corresponding to the plurality of light focusing phase maps satisfied by the phase distribution of the single nanostructure-integrated metalens (e.g., a 1-inch CMOS sensor). A barrel or other lens support structure may be included in the apparatus to hold the single nanostructure-integrated metalens at a desired, predetermined distance from the sensor array from within a range of focal distances corresponding to the plurality of light focusing phase maps satisfied by the phase distribution of the single nanostructure-integrated metalens. The single nanostructure-integrated metalens of the apparatus of embodiments is configured with nanostructures integrated on an optical substrate to focus light incident on the single nanostructure-integrated metalens onto the sensor array, wherein at least one side of the optical substrate deposited with nanostructures faces towards the inner side of the apparatus. Nanostructures of embodiments of a single nanostructure-integrated metalens may thus be disposed inside the apparatus, such as for providing protection with respect to the nanostructures. The single nanostructure-integrated metalens of embodiments may be configured with nanostructures integrated on the optical substrate so as to focus light incident on the optical substrate within a wide field of view ("FOV") (e.g., 10°≤FOV≤90°). Additionally, the optical substrate may include a bandpass filtering layer for attenuating light having wavelengths outside the range spanning the plurality of wavelengths corresponding to the plurality of light focusing phase maps satisfied by the phase distribution of the single nanostructure-integrated metalens.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

6

Figure 1A:
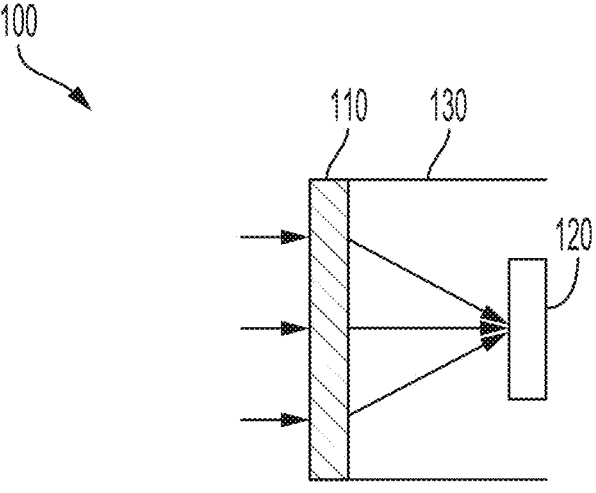
Figure 1B:
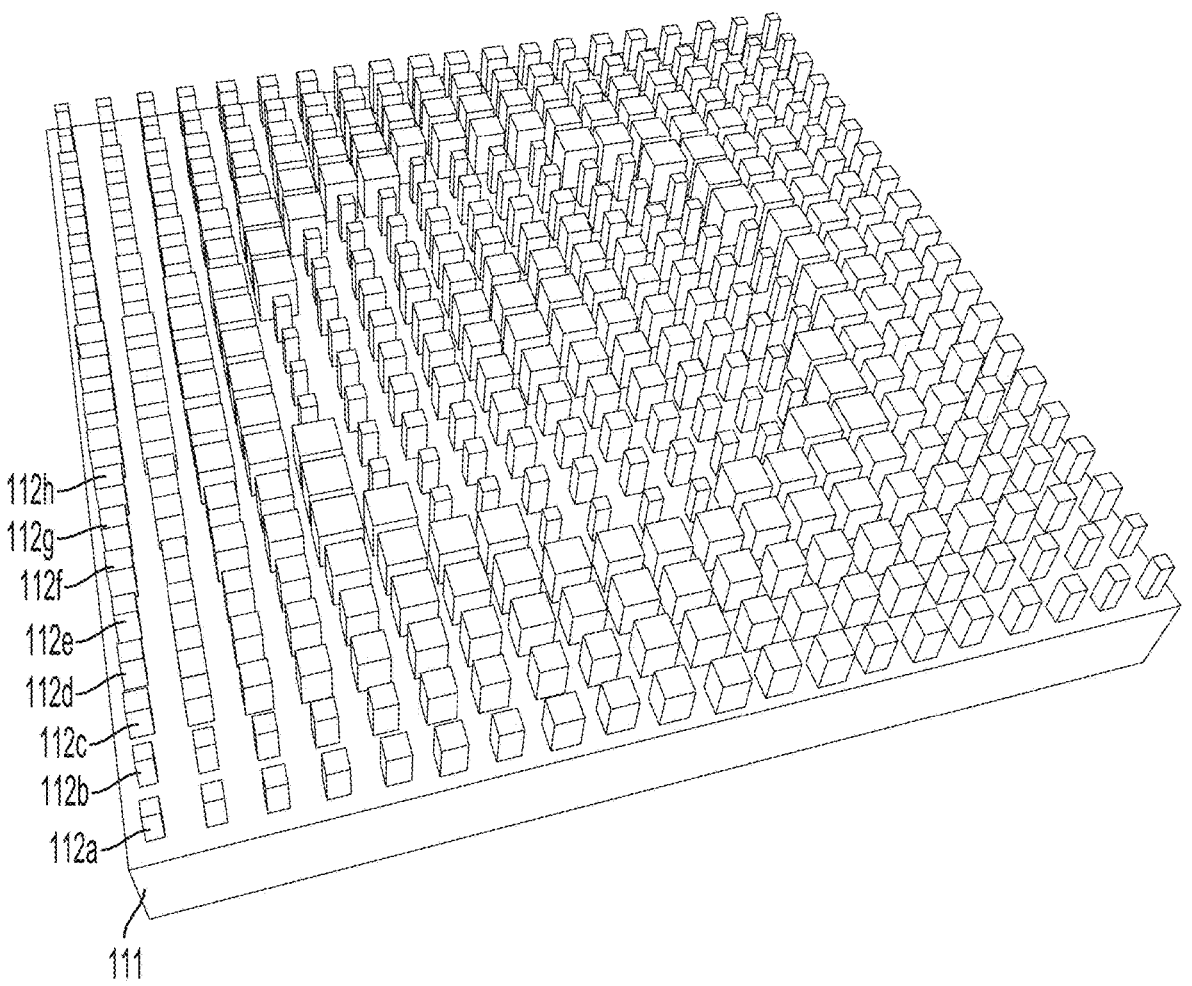
Figure 2:
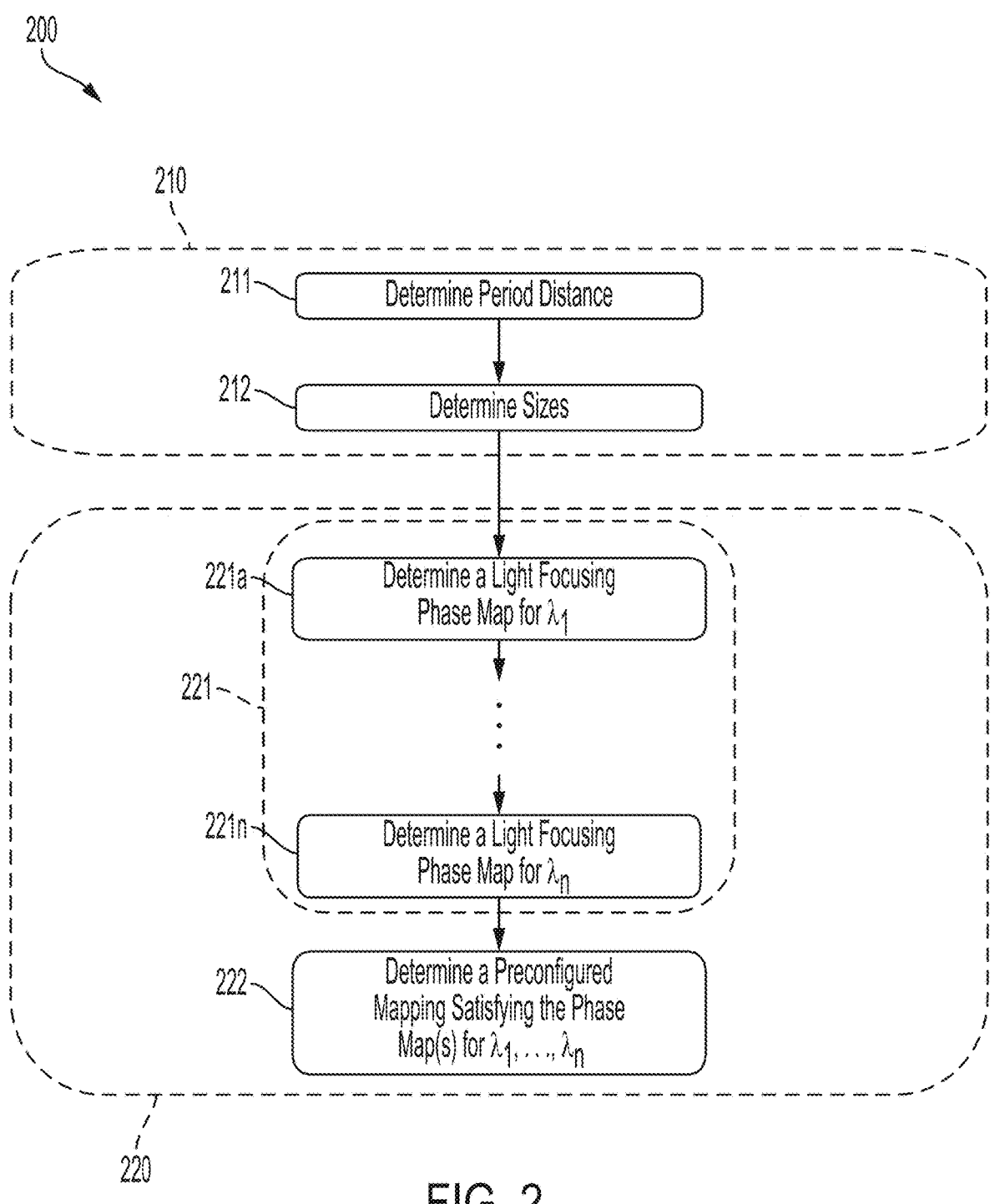
Figures 3A, 3B:
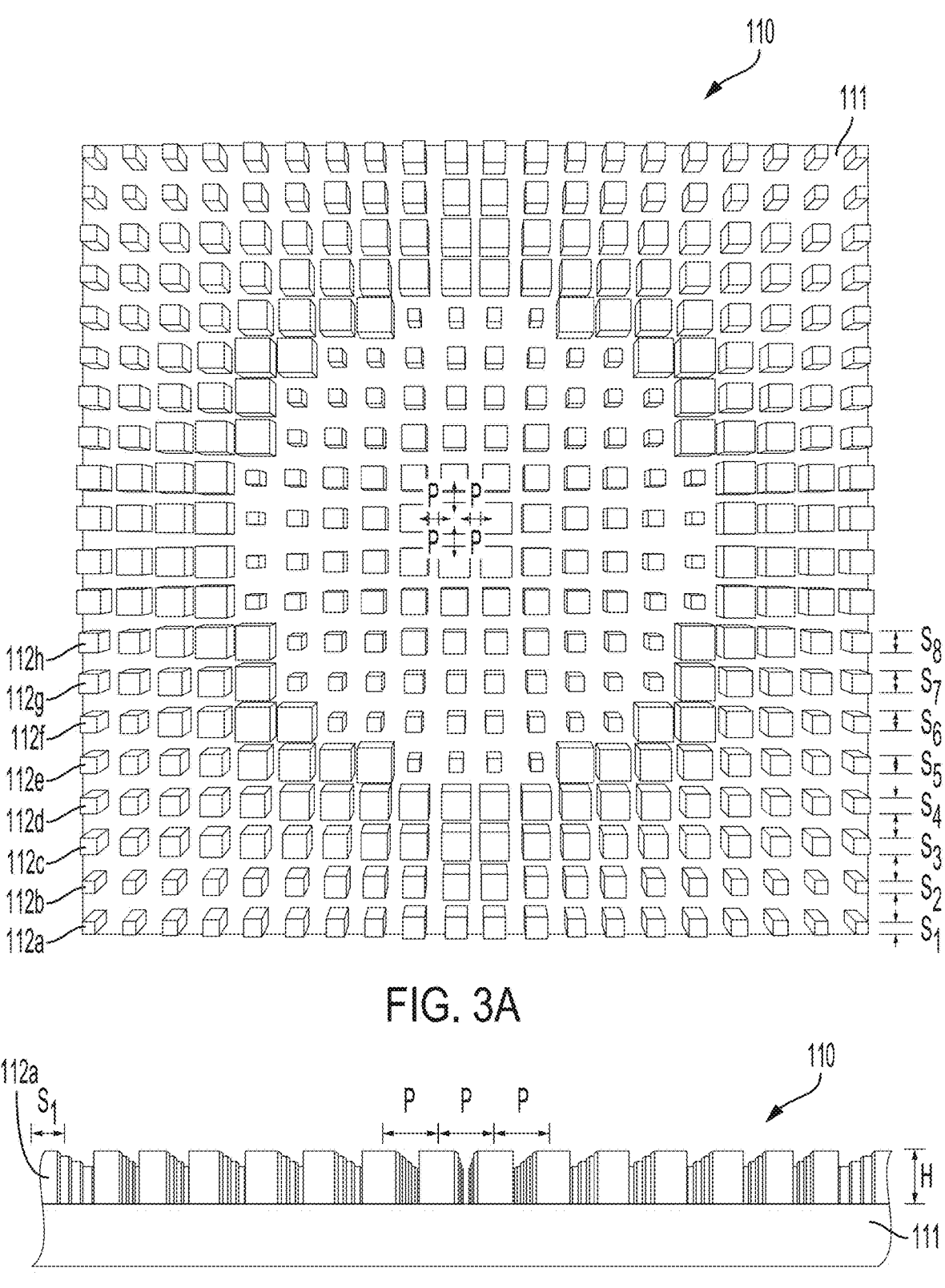
Figure 4C:
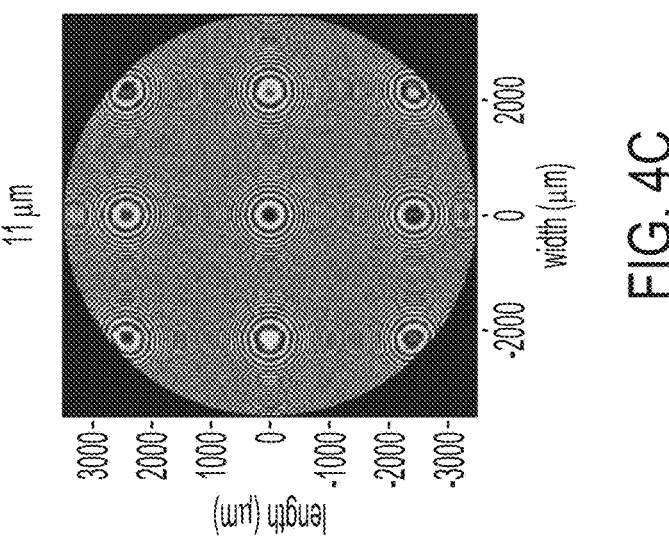
Figure 4B:
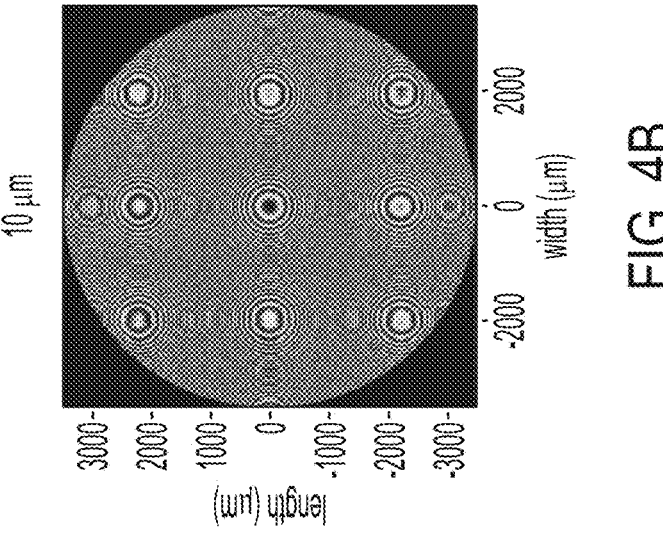
Figure 4A:
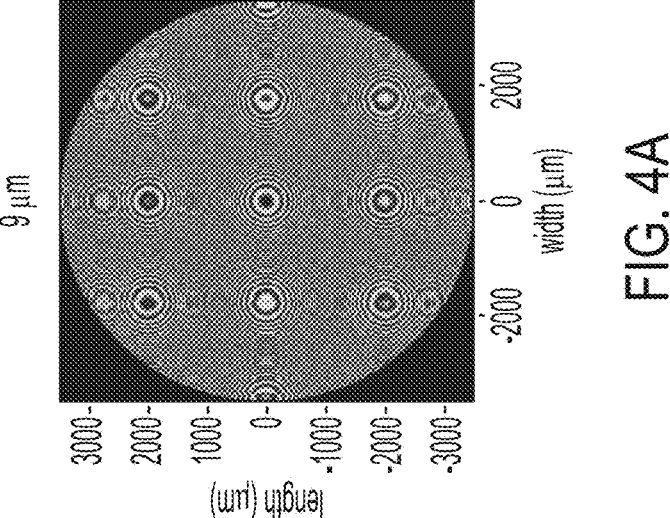
Figure 5:
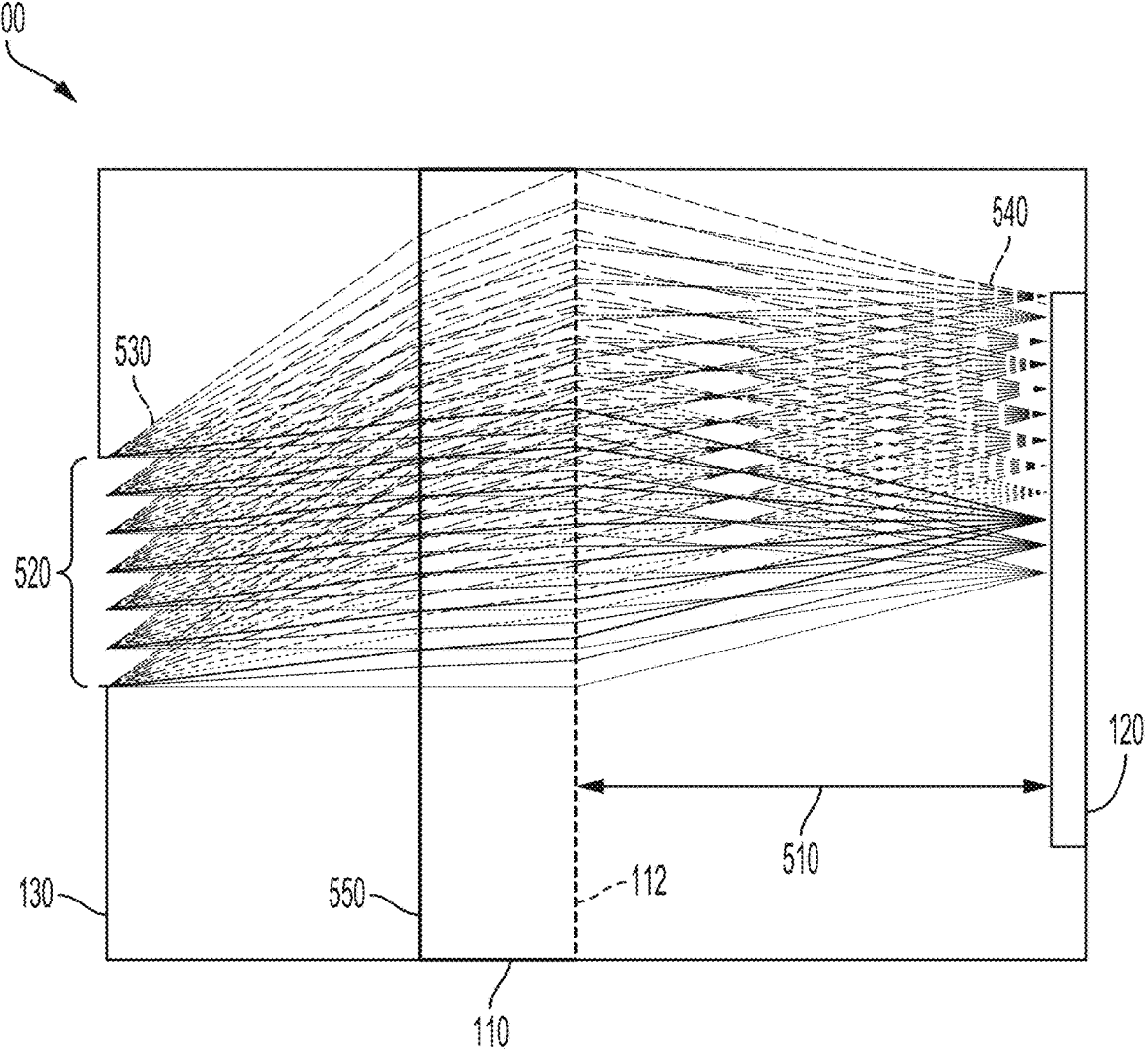

FIG. 1A is an optical sensor device comprising a single nanostructure-integrated metalens configuration according to embodiments of the invention;

FIG. 1B is an isometric view of a single nanostructure-integrated metalens implementation according to embodiments of the invention;

FIG. 2 is a flow diagram of operations implemented with respect to configuring embodiments of a single nanostructure-integrated metalens according to embodiments of the invention;

FIG. 3A is a plan view of a single nanostructure-integrated metalens implementation according to embodiments of the invention;

FIG. 3B is a side view of a single nanostructure-integrated metalens implementation according to embodiments of the invention;

FIG. 4A is an example of a light focusing phase map computed for a single nanostructure-integrated metalens configuration according to embodiments of the invention;

FIG. 4B is an example of a light focusing phase map computed for a single nanostructure-integrated metalens configuration according to embodiments of the invention;

FIG. 4C is an example of a light focusing phase map computed for a single nanostructure-integrated metalens configuration according to embodiments of the invention; and FIG. 5 is an optical sensor device comprising a single nanostructure-integrated metalens configuration according to embodiments of the invention.

DETAILED DESCRIPTION

FIG. 1A shows an example embodiment of a single nanostructure-integrated metalens configuration in accordance with concepts of the present invention. In particular, FIG. 1A illustrates an example embodiment of optical sensor device 100 comprising single nanostructure-integrated metalens 110, sensor array 120, and support structure 130. Optical sensor device 100 including sensor array 120 and juxtaposed single nanostructure-integrated metalens 110 of the illustrated embodiment may, for example, be utilized as an imaging apparatus in various optical sensor devices, such as to capture images in the infrared (IR) spectrum.

Support structure 130 provides structural support to hold single nanostructure-integrated metalens 110 in a desired predetermined relationship with an image detection plane of sensor array 120. A distance at which a single nanostructure-integrated metalens is held from an image detection plane of a sensor array may correspond to a focal distance (i.e., a distance at which light incident on a single nanostructure-integrated metalens having a particular wavelength is focused in the image plane) of single nanostructure-integrated metalens 110. For example, in some embodiments, single nanostructure-integrated metalens 110 may be configured to focus a single design wavelength of light (e.g., a center wavelength $\lambda_c$ of single nanostructure-integrated metalens 110) such that there is a single focal distance for which single nanostructure-integrated metalens 110 focuses light having the single design wavelength most effectively. Support structure 130 of embodiments of single nanostructure-integrated metalens 110 may be configured to position the lens plane of single nanostructure-integrated metalens 110 the focal distance associated with the single design wavelength from the image detection plane of sensor array 120 so as to focus light having the single design wavelength onto the image detection plane of sensor array 120. In other embodiments, single nanostructure-integrated metalens 110 may be configured to focus a plurality of design wavelengths $\lambda_n$, each design wavelength associated with a design focal distance f n, such that single nanostructure-integrated metalens 110 may feature a range of focal distances, spanning between the smallest $f_n$ and the largest $f_n$, for which single nanostructure-integrated metalens 110 is effective at focusing light. Embodiments of single nanostructure-integrated metalens 110 supporting focusing functionality for a plurality of design wavelengths $\lambda_n$ may also feature a center wavelength $\lambda_c$ and in such embodiments $\lambda_c$ may correspond to the centermost wavelength of the range of wavelengths spanning between the smallest wavelength and the largest wavelength of the plurality of design wavelengths $\lambda_n$. Further, some embodiments of single nanostructure-integrated metalens 110 provide for selection of design wavelengths $\lambda_n$ such that design focal distances $f_n$ are near in value to a center focal distance $f_c$ corresponding to center wavelength $\lambda_c$ (e.g., the plurality of $f_n$ satisfy the relation $0.95 \leq f_n/f_c \leq 1.05$). Additionally, support structure 130 of embodiments of single nanostructure-integrated metalens 110 may be configured to position the lens plane of single nanostructure-integrated metalens 110 a distance from within the range of focal distances from the image detection plane of sensor array 120 so as to focus light having wavelengths from within the range spanning the plurality of design wavelengths onto the image detection plane of sensor array 120.

Embodiments of support structure 130 may comprise a barrel (e.g., circular cylinder or ellipsoid cylinder wall open at both ends), a box (e.g., square or rectangular walls open at both ends), or other configuration providing mechanical means having a lumen allowing adequate light passage and configured to support single nanostructure-integrated metalens 110 in juxtaposition with sensor array 120. In accordance with some examples, support structure 130 is configured to engage an optical substrate of single nanostructure-integrated metalens 110 at a periphery of the optical substrate (e.g., around the circumference of the optical substrate, at an outer edge of a surface of the optical substrate immediately adjacent to the circumference of the optical substrate, etc.) selected so as to avoid damage of metastructures integrated on the surface of the optical substrate facing sensor array 120.

Sensor array 120 may comprise a matrix of pixels arranged in an image detection plane configured for imaging. The pixels of sensor array 120 may be configured to detect light having wavelengths from within a detection range of IR spectrum wavelengths (i.e., from approximately 780 nm to 14 μm), a detection range of visual spectrum wavelengths (i.e., from approximately 400 nm to 700 nm), a detection range of ultraviolet (UV) spectrum wavelengths (i.e. from approximately 10 nm to 400 nm), or a combination thereof. For example, sensor array 120 may comprise 13.2 mm by 8.8 mm matrix of IR light detecting pixels integrated onto a semiconductor substrate (e.g., a 1-inch complementary metal-oxide semiconductor (CMOS) sensor). According to some embodiments, the detection range of sensor array 120 may encompass a center wavelength $\lambda_c$ of single nanostructure-integrated metalens 110. In other embodiments, the detection range of sensor array 120 may encompass a plurality of design wavelengths $\lambda_n$, in addition to a center wavelength $\lambda_c$ of single nanostructure-integrated metalens 110, for which single nanostructure-integrated metalens 110 is configured to provide light focusing functionality.

In some embodiments, the detection range of sensor array 120 may span no more than a single IR sub-spectrum. For example, sensor array 120 may be configured to detect only wavelengths from within the long-wave IR (LWIR) sub-spectrum (i.e., wavelengths of approximately 8 μm-14 μm), only wavelengths from within the mid-wave IR (MWIR) sub-spectrum (i.e., wavelengths of approximately 3 μm-5 μm), or only wavelengths from within the near IR (NIR) sub-spectrum (i.e., wavelengths of approximately 780 nm-2500 nm). In other embodiments, the detection range of sensor array 120 may span wavelengths from multiple IR sub-spectrums. For example, sensor array 120 may include both pixels configured to detect LWIR wavelengths as well as pixels configured to detect MWIR wavelengths integrated onto a single semiconductor substrate, pixels configured to detect both LWIR wavelengths as well as MWIR wavelengths, or a combination thereof. Although the foregoing example is described with regard to embodiments having sensor array 120 configured to detect LWIR and MWIR wavelengths, other embodiments may feature sensor arrays configured to detect MWIR and NIR wavelengths, LWIR and NIR wavelengths, or a combination of LWIR, MWIR and NIR wavelengths.

Single nanostructure-integrated metalens 110 of embodiments provides a thin, flat lens configuration adapted for light focusing functionality. More specifically, embodiments of single nanostructure-integrated metalens 110 may be configured to focus light having wavelengths from within a range of IR spectrum wavelengths, a range of visual spectrum wavelengths, a range of UV spectrum wavelengths, or a combination thereof. Further, embodiments of single nanostructure-integrated metalens 110 configured for focusing IR wavelengths may be utilized to focus light having wavelength(s) from within any of the IR sub-spectrums (e.g., wavelengths from within LWIR sub-spectrum, MWIR sub-spectrum, NIR sub-spectrum, or a combination thereof). Additionally, embodiments of single nanostructure-integrated metalens 110 configured for focusing IR wavelengths may be utilized to focus light comprising a single IR wavelength, a narrowband range of IR wavelengths (e.g., 1 μm or less), or a wideband range of IR wavelengths (e.g., a range of up to 6 μm). Moreover, wideband ranges of IR wavelengths or narrowband ranges of IR wavelengths focused using single nanostructure-integrated metalens 110 of embodiments herein may span a single IR sub-spectrum (e.g., configured to focus only wavelengths from within the LWIR sub-spectrum, wavelengths within the MWIR sub-spectrum, or wavelengths within the NIR sub-spectrum) or may span multiple IR sub-spectrums (e.g., configured to focus wavelengths from within the LWIR sub-spectrum as well as wavelengths from within the MWIR sub-spectrum and/or the NIR sub-spectrum).

According to embodiments, single nanostructure-integrated metalens 110 comprises an optical substrate (e.g., a transparent substrate with a transparent spectral range of at least 50 nm corresponding to the center wavelength of the operation wavelength of an associated light source, such as 50 nm or greater transparent spectral range centered at the center frequency of sensor array 120), such as may comprise optical glass, quartz, fused silica, plastic, chalcogenides, germanium (Ge), silicon (Si), zinc selenide (ZnSe), zinc sulfide (ZnS), etc. For example, in some embodiments, single nanostructure-integrated metalens 110 may be configured to focus light over the entire transparent spectral range of the optical substrate such that transparent spectral range of the optical substrate is centered at both the center wavelength of the operation wavelength region of single nanostructure-integrated metalens 110 and at the center wavelength of a device (e.g., sensor array 120) to be used with single nanostructure-integrated metalens 110. The optical substrate of single nanostructure-integrated metalens 110 of embodiments has a preconfigured mapping of integrated nanostructures (e.g., nano cubes, nano cuboids, nano cylinders, nano elliptic cylinders, etc. of different, quantized lateral sizes) integrated thereon. The nanostructures may be comprised of various materials, such as dielectric material (e.g., silicon (Si), silicon nitride (SiN), gallium nitride (GaN), titanium dioxide ($TiO_2$), etc.), plasmonic metallic materials (e.g. materials including gold (Au), silver (Ag), platinum (Pt), and/or palladium (Pd)), and/or other materials providing optical properties for modulating the behaviors of electromagnetic waves. In accordance with embodiments of single nanostructure-integrated metalens 110, the optical substrate is oriented such that a surface of the optical substrate upon which nanostructures are disposed upon faces sensor array 120 (e.g., a surface of the optical substrate having integrated nanostructures is incarcerated within a lumen of support structure 130, providing protection to the nanostructures of that surface).

FIG. 1B shows an example embodiment of single nanostructure-integrated metalens 110 comprising optical substrate 111 having nanostructures 112 (shown as nanostructures 112a-112h having 8 different quantized lateral sizes, corresponding to 8 phase levels to be implemented in the illustrated example, arranged in a predetermined mapping configured to focus incident light) integrated on a surface of the optical substrate. It should be appreciated that, although the example of FIG. 1B shows nanostructures disposed on the surface of one side of optical substrate 111, nanostructures of a same or different configuration disposed in a same or different predetermined mapping may additionally be disposed on the surface of the opposite side of the optical substrate of some embodiments of the invention.

As should be appreciated from the illustration of FIG. 1A, the example implementation of optical sensor device 100 comprises single nanostructure-integrated metalens 110 as the only optical element. That is, no optical elements (e.g., additional metalens element(s), conventional lens element(s), collimator(s), concentrator(s), mirror(s), etc.) are provided in the light path between sensor array 120 and single nanostructure-integrated metalens 110 of the illustrated embodiments, facilitating a short total track length with respect to optical sensor device 100. In operation according to embodiments of the invention, single nanostructure-integrated metalens 110 provides light focusing functionality, such as to provide focusing for wavelengths(s) of IR light from within one or more IR sub-spectrum. For example, as described in further detail below, mapping and corporeal aspects (e.g., nanostructure materials, form of nanostructures, period distance for the nanostructures, height of the nanostructures, and/or a lateral size of the nanostructures) with respect to nanostructures 112 are selected and/or configured for implementing desired light focusing functionality according to embodiments of the invention. In accordance with some examples, configurations of single nanostructure-integrated metalens 110 may provide a range of supported focal distances and relatively wide fields of view (FOV) (e.g., $10° \leq FOV \leq 90°$). In operation according to embodiments, single nanostructure-integrated metalens 110 may be utilized in a light focusing implementation, such as to provide focusing functionality for various imaging applications (e.g., optical sensor devices utilized for thermal camera applications, gas analysis applications, security imaging applications, 3D sensing applications, etc.).

FIG. 2 shows a flow diagram of operations implemented with respect to configuring embodiments of a single nanostructure-integrated metalens according to concepts of the present invention. In particular, flow 200 provides exemplary operations as may be utilized in configuring implementations of single nanostructure-integrated metalens 110 to light focusing functionality for one or more design wavelength(s) $\lambda_n$ in accordance with embodiments of the invention.

Operations of flow 200 may, for example, be performed by one or more processor-based systems operating under control of instruction sets (e.g., computer executed logic, such as software, firmware, etc.) configured to provide operation as described herein. Such processor-based systems may comprise one or more processors, such as a CORE or PENTIUM processor; requisite computer/processor readable memory, such as random access memory (RAM), read only memory (ROM), flash memory, disk memory, solid state disk (SSD) memory, optical memory, and/or the like; and input/output components, such as display, network interface card (NIC), keyboard, digital pointer, printer, and/or the like; coupled to a processor of the one or more processors via a data bus and operable to provide functionality as described herein.

Block 210 of flow 200 illustrated in FIG. 2 provides operations for selecting or otherwise determining corporeal aspects with respect to the nanostructures for a particular configuration of single nanostructure-integrated metalens 110. For example, at block 211 of the illustrated embodiment a period distance for the nanostructures (e.g., a center distance with respect to adjacent nanostructures) is determined. At block 212 of the illustrated embodiment sizes of the nanostructures (e.g., height and lateral sizes) is determined. Corporeal aspects in addition or in the alternative to the foregoing may be selected or otherwise determined at block 210 of embodiments, such as a form of nanostructure (e.g., one or more forms of nanostructures, such as nano cube, nano cuboid, nano cylinder, nano elliptic cylinder, etc.), a nanostructure material (e.g., particular dielectric, plasmonic metallic material, and/or material providing a particular refractive index), etc. In accordance with embodiments of the invention, nanostructure materials having a refractive index not smaller than 1.5 (e.g., $n \geq 1.5$) for light at the operation wavelength region of the single nanostructure-integrated metalens (e.g., in an example of an NIR implementation using light having a wavelength of 940 nm, silicon, providing a refractive index of 3.5-3.75, may be selected for the nanostructure material of an implementation).

A period distance (P) utilized according to examples is a row-to-row and column-to-column (e.g., perpendicular first and second axes) center distance implemented with respect to adjacent ones of nanostructures 112, as illustrated in FIGS. 3A and 3B. In operation according to block 211 of embodiments of the invention, a period distance for the nanostructures is determined based at least in part on the wavelength of light with respect to the operation wavelength region of single nanostructure-integrated metalens 110. For example, the period distance may be selected in correspondence to the center wavelength ($\lambda_c$) of the operation wavelength region of the single nanostructure-integrated metalens (e.g., $\lambda_c = 940$ nm in an exemplary NIR implementation, $\lambda_c = 4$ μm in an exemplary MWIR implementation, $\lambda_c = 9.5$ μm in an exemplary LWIR implementation, $\lambda_c = 7$ μm in an exemplary implementation featuring an operation wavelength region of single nanostructure-integrated metalens 110 spanning both MWIR and LWIR wavelengths). According to some examples of the invention, the period distance may be selected to fall within a range defined by the center wavelength of the operation wavelength region of the single nanostructure-integrated metalens (e.g., $((\lambda_c*1.2)/2)\geq P\geq(\lambda_c/2)$ or $((\lambda_c*1.2)/2)\geq P\geq((\lambda_c*0.8)/2))$. The period distance may, for example, be in the range of 400-550 nm in some examples of focusing light having wavelengths within the NIR sub-spectrum (e.g., the period distance, P, may be selected to be 500 nm in an example of the above mentioned NIR implementation in which the center wavelength, $\lambda_c$, is 940 nm). As another example, the period distance may be in the range of 3.8-5.7 μm in some examples of focusing light having wavelengths within the LWIR sub-spectrum (e.g., the period distance, P, may be selected to be 4 μm in an example of the above mentioned LWIR implementation in which the center wavelength, is 9.5 μm). The particular value for the period distance in the aforementioned range may, for example, be selected according to some examples based upon considerations such as the flexibility of the phase design, the field of vision, the fabrication difficulty etc. with respect to the configuration of single nanostructure-integrated metalens 110. In accordance with embodiments of the invention, the period distance utilized with respect to each nanostructure of a particular mapping of nanostructures (e.g., all nanostructures on a first surface of the optical substrate) of single nanostructure-integrated metalens 110, irrespective of the lateral size(s) of the adjacent nanostructures, is equal. Accordingly, a period distance of embodiments provides an upper boundary on the lateral size of those nanostructures.

A height (H) of the nanostructures, as illustrated in FIG. 3B, is the fabrication depth of the nanostructures according to examples. In operation according to block 212 of embodiments of the invention, determining sizes of the nanostructures may include determining a height for the nanostructures based at least in part on the wavelength of light with respect to the operation wavelength region of single nanostructure-integrated metalens 110. For example, the height may be selected in correspondence to the center wavelength $(\lambda_c)$ of the operation wavelength region of the single nanostructure-integrated metalens (e.g., $\lambda_c=940$ nm in the above mentioned exemplary NIR implementation or $\lambda_c=9.5$ μm in the above mentioned exemplary LWIR implementation). According to some examples of the invention, the height may be selected to fall within a range defined by the center wavelength of the operation wavelength region of the single nanostructure-integrated metalens (e.g., $\lambda_c\geq H\geq(\lambda_c/10)$). The height may, for example, be in the range of 100-800 nm in some examples of focusing light having wavelengths within the NIR sub-spectrum (e.g., the height, H, may be selected to be 490 nm in an example of the above mentioned NIR implementation in which the center wavelength, is 940 nm). As another example, the height may, for example, be in the range of 1-9 μm in some examples of focusing light having wavelengths within the LWIR sub-spectrum (e.g., the height, H, may be selected to be 5 μm in an example of the above mentioned LWIR implementation in which the center wavelength, $\lambda_c$, is 9.5 μm). The particular value for the height may, for example, be selected according to some examples based upon considerations such as the desired or acceptable performance of single nanostructure-integrated metalens 110, ease or difficulty of fabrication of the single nanostructure-integrated metalens, etc. In accordance with embodiments of the invention, the height utilized with respect to each nanostructure of a particular mapping of nanostructures (e.g., all nanostructures on a first surface of the optical substrate) of single nanostructure-integrated metalens 110, irrespective of the lateral size(s) of the adjacent nanostructures, is equal.

A lateral size (S) of the nanostructures, as illustrated in FIGS. 3A and 3B, is the size of a respective nanostructure in the plane of the optical substrate upon which the nanostructure is integrated. For example, the lateral size of the nanostructures of embodiments may each comprise a lateral size of a plurality of quantized lateral sizes for the nanostructures (e.g., 2, 4, 6, 8, 12, 16, etc. different lateral sizes). That is, nanostructures with different lateral sizes modify incident light with different values of phase shift levels. According to embodiments, the number of lateral sizes of a plurality of quantized lateral sizes for the nanostructures corresponds to the number of phase levels to be implemented with respect to single nanostructure-integrated metalens 110. That is, the nanostructures may be provided in a selected number (e.g., 2, 4, 6, 8, 12, 16, etc.) of quantized lateral sizes corresponding to the same number of levels of phase change. For example, in the example of FIGS. 3A and 3B, the number of lateral sizes is 8, providing for lateral size $S_1$ (e.g., nanostructure 112a), lateral size $S_2$ (e.g., nanostructure 112b), lateral size $S_3$ (e.g., nanostructure 112c), lateral size $S_4$ (e.g., nanostructure 112d), lateral size $S_5$ (e.g., nanostructure 112e), lateral size $S_6$ (e.g., nanostructure 1120, lateral size $S_7$ (e.g., nanostructure 112g), and lateral size $S_8$ (e.g., nanostructure 112h), wherein each of lateral sizes $S_1$-$S_8$ corresponds to a lateral size of the respective nanostructure for modifying the phase of incident light a desired amount (e.g., $S_1\rightarrow\pi/4$, $S_2\rightarrow\pi/2$, $S_3\rightarrow 3\pi/4$, $S_4\rightarrow\pi$, $S_5\rightarrow 5\pi/4$, $S_6\rightarrow 3\pi/2$, $S_7\rightarrow 7\pi/4$, and $S_8\rightarrow 2\pi$). According to another example, the number of lateral sizes may be 4, providing for lateral sizes $S_1$, $S_2$, $S_3$, and $S_4$, wherein each of lateral sizes $S_1$-$S_4$ corresponds to a lateral size of the respective nanostructure for modifying the phase of incident light a desired amount (e.g., $S_1\rightarrow\pi/2$, $S_2\rightarrow\pi$, $S_3\rightarrow 3\pi/2$, and $S_4\rightarrow 2\pi$). It should be appreciated that the particular sizes implemented to provide the desired phase level modifications may vary based upon aspects of the specific nanostructure implementation, such as the material, height, etc., utilized for the nanostructures (e.g., refractive index). According to some examples of the invention, the lateral sizes may be selected to fall within a range defined by the period distance of the single nanostructure-integrated metalens (e.g., $P\geq S_x>0$). The lateral sizes may, for example, be in the range of 100-400 nm in some examples of focusing light having wavelengths within the NIR sub-spectrum (e.g., in an example of the above mentioned NIR implementation in which the center wavelength, $\lambda_c$, is 940 nm and the selected period distance, P, is 500 nm). As another example, the lateral sizes may, for example, be in the range of 1-3 μm in some examples of focusing light having wavelengths within the LWIR sub-spectrum (e.g., in an example of the above mentioned LWIR implementation in which the center wavelength, $\lambda_c$, is 9.5 μm and the selected period distance, P, is 4 μm). The particular value for the lateral sizes may, for example, be selected according to some examples based upon considerations such as the desired or acceptable performance of single nanostructure-integrated metalens 110, ease or difficulty of fabrication of the single nanostructure-integrated metalens, etc. In accordance with embodiments of the invention, the nanostructures are configured to have the same spatial resolution in x and y axes. Additionally, in accordance with embodiments of the invention, the geometric form (e.g., nano cubes, nano cuboids, nano cylinders, nano elliptic cylinders, etc.) of different, quantized lateral sizes utilized with respect to each nanostructure of a particular mapping of nanostructures (e.g., all nanostructures on a first surface of the optical substrate) of single nanostructure-integrated metalens 110, irrespective of the lateral size(s) of the adjacent nanostructures, may be identical in order to reduce fabrication complexity for single nanostructure-integrated metalens 110.

In accordance with embodiments, single nanostructure-integrated metalens 110 may provide light focusing functionality for a single wavelength of light or a plurality of wavelengths of light. Block 220 of flow 200 illustrated in FIG. 2 provides operations for selecting or otherwise determining mapping of integrated nanostructures for implementing light focusing functionality for one or more design wavelength(s) $\lambda_n$ by single nanostructure-integrated metalens 110. For example, at block 221 of the illustrated embodiment, one or more phase map(s) for focusing light having one or more discrete design wavelength(s) $\lambda_n$ by single nanostructure-integrated metalens 110 is/are determined. Specifically, at block 221a of the illustrated embodiment, a phase map configured for focusing light having design wavelength $\pi_1$ by single nanostructure-integrated metalens 110 is determined. Further, as noted in block 221n, any number of individual phase maps each corresponding to a discrete design wavelength may be determined in block 221 (e.g., a single phase map corresponding to one design wavelength $\lambda_1$, two phase maps each corresponding to one of two design wavelengths $\lambda_1$ and $\lambda_2$, n phase maps each corresponding to one of n design wavelengths $\lambda_1$ through $\lambda_n$, etc.).

In operation according to block 221 of embodiments of the invention, light focusing phase map(s) with respect to particular design wavelength(s) for single nanostructure-integrated metalens 110 may be computed using numerical calculations such as a phase focusing design technique (e.g., diffractive phase function) according to some examples. For example, calculations for phase focusing light to a nanostructure layer of a single nanostructure-integrated lens may be binary diffractive designed, such as based on the Binary2 lens phase function $$\Phi_2 = M \sum\nolimits_{i=1}^{N} A_i p^{2i}$$

using an optical design program (e.g., ZEMAX). In other embodiments, light focusing phase map(s) with respect to particular design wavelength(s) for single nanostructure-integrated metalens 110 may be computed using empirical methods. For example, computing phase maps using empirical methods may comprise designing and fabricating a single nanostructure-integrated metalens having a first configuration of nanostructures, measuring the phase distribution of the first configuration of nanostructures, adjusting the design based on the phase distribution of the first configuration, fabricating a single nanostructure-integrated metalens having a second configuration of nanostructures based on the adjusted design, and continuing this process until reaching a desired phase distribution. Additionally, computation of light focusing phase map(s) with respect to particular design wavelength(s) for single nanostructure-integrated metalens 110, in accordance with some embodiments, may utilize a combination of numerical calculations and empirical methods.

At block 222 of the illustrated embodiment, a preconfigured mapping of integrated nanostructures (i.e., hereinafter referred to as a "preconfigured mapping") is determined for single nanostructure-integrated metalens 110 which provides a desired spatial pattern of optical phase changes (e.g., phase rotation or offset) with respect to light incident on single nanostructure-integrated metalens 110. In embodiments, the preconfigured mapping defines a configuration for the nanostructures of single nanostructure-integrated metalens 110 such that nanostructures at position(s) (x,y) on the optical substrate of single nanostructure-integrated metalens 110 satisfy the consolidated phase retardation requirements (i.e., $\Phi(x,y,\lambda_n)$ of the phase map(s) determined during block 221.

Embodiments of single nanostructure-integrated metalens 110 configured to provide light focusing functionality in accordance with a preconfigured mapping (e.g., the preconfigured mapping for single nanostructure-integrated metalens 110 determined during block 222) satisfying one or more phase map(s) (e.g., the one or more phase map(s) determined during block 221) corresponding to one or more design wavelength(s) (e.g., design wavelength(s) $\lambda_1$ through $\lambda_n$ of block 221) are not limited to focusing light having wavelength of the one more design wavelength(s). Instead, embodiments of single nanostructure-integrated metalens 110 provide light focusing functionality for a continuous range of wavelengths encompassing the one or more design wavelength(s) of single nanostructure-integrated metalens 110. However, effectiveness of light focusing functionality decreases as a function of wavelength the further removed a wavelength of light is from a design wavelength of single nanostructure-integrated metalens 110. Therefore, embodiments of single nanostructure-integrated metalens 110 having more tightly grouped design wavelength pluralities provide more effective light focusing over the wavelength range spanned by a plurality of design wavelengths than single nanostructure-integrated metalens 110 embodiments having more widely spaced design wavelength pluralities provide over the wavelength range spanned by a plurality. For example, a single nanostructure-integrated metalens 110 embodiment having three design wavelengths of 9.5 µm, 10 µm, and 10.5 µm (e.g., $\lambda_1$=9.5 µm, $\lambda_2$=10 µm, and $\lambda_3$=10.5 µm) provides more effective light focusing over the wavelength range from 9.5 µm to 10.5 µm than a single nanostructure-integrated metalens 110 embodiment having three design wavelengths of 8 µm, 10 µm, and 12 µm (e.g., $\lambda_1$=8 µm, $\lambda_2$=10 µm, and $\lambda_3$=12 µm) provides over the wavelength range from 8 µm to 12 µm. However, for the same reasons as explained above, single nanostructure-integrated metalens 110 embodiments also do not provide effective light focusing for wavelengths outside the wavelength range spanned by the plurality of design wavelengths of the embodiment (i.e., effective light focusing bandwidth). Therefore, single nanostructure-integrated metalens 110 embodiments having more widely spaced design wavelength pluralities provide wider effective light focusing bandwidths than are provided by single nanostructure-integrated metalens 110 embodiments have more tightly grouped design wavelength pluralities of the same number of design wavelengths. For example, a single nanostructure-integrated metalens 110 embodiment having three design wavelengths of 9.5 µm, 10 µm, and 10.5 µm (e.g., $\lambda_1$=9.5 µm, $\lambda_2$=10 µm, and $\lambda_3$=10.5 µm) provides an effective light focusing bandwidth of 1 µm whereas a single nanostructure-integrated metalens 110 embodiment having three design wavelengths of 8 µm, 10 µm, and 12 µm (e.g., $\lambda_1$=8 µm, $\lambda_2$=10 µm, and $\lambda_3$=12 µm) provides an effective light focusing bandwidth of 4 µm.

Accordingly, the number of design wavelengths of single nanostructure-integrated metalens 110 as well as the distribution of those design wavelengths may, for example, be selected according to some examples based upon considerations such as the desired or acceptable performance of single nanostructure-integrated metalens 110, ease or difficulty of fabrication of the single nanostructure-integrated metalens, etc. For example, embodiments having more widely spaced distributions have wider effective light focusing bandwidths but provide less effective light focusing over the light focusing band, whereas embodiments having more tightly grouped distributions have narrower effective light focusing bandwidths but provide more effective light focusing over the light focusing band. Additionally, embodiments featuring greater numbers of design wavelengths may provide wider effective light focusing bandwidths without sacrificing effectiveness of light focusing within the band but support for a greater number of design wavelengths comes with increased design and fabrication complexity and associated costs. Because the phase distribution of a preconfigured mapping of single nanostructure-integrated metalens 110 may satisfy light focusing phase maps for a plurality of design wavelengths, embodiments may support higher quality light focusing over wideband wavelength ranges (e.g., wideband IR wavelength ranges) while utilizing no additional optical elements (e.g., additional metalenses, traditional lenses, etc.) in association with single nanostructure-integrated metalens 110, facilitating a short total track length with respect to the apparatus and a lower number and cost of components in the apparatus.

FIGS. 4A-4C illustrate an example plurality of phase maps satisfied by a preconfigured mapping of a single nanostructure-integrated metalens embodiment, in accordance with embodiments described above. Specifically, FIGS. 4A-4C illustrate three examples of phase maps computed for a single nanostructure-integrated metalens providing light focusing functionality for wavelengths within the LWIR sub-spectrum in accordance with embodiments described herein. Single nanostructure-integrated metalens 110 of the illustrated embodiment is configured to a preconfigured mapping which satisfies three phase maps each corresponding to one of three design wavelengths: 9 μm, 10 μm, and 11 μm (e.g. $\lambda_1$=9 μm, $\lambda_2$=10 μm, and $\lambda_3$=11 μm, wherein 10 μm is also the center wavelength $\lambda_c$ of the single nanostructure-integrated metalens embodiment (e.g., $\lambda_2$=$\lambda_c$=10 μm). FIG. 5A corresponds to a phase map for 9 μm, FIGURE corresponds to a phase map for 10 μm, and FIG. 5C corresponds to a phase map for 11 μm. Each phase map illustrated in FIGS. 4A-4C may be a phase map as determined in block 221 of flow 200 and the preconfigured mapping of the present single nanostructure-integrated metalens embodiment may be a preconfigured mapping as determined in block 222 of flow 200. Additionally, the three corresponding design wavelengths of the illustrated embodiment may be a plurality of design wavelengths in accordance with embodiments described above.

The foregoing exemplary operation according to flow 200 provides for determining corporeal aspects and a preconfigured mapping with respect to nanostructures for providing an implementation of single nanostructure-integrated metalens 110 configured to provide light focusing functionality for light having one or more wavelength(s) in accordance with embodiments of the invention. The determined preconfigured mapping, which satisfies one more phase map(s) corresponding to one or more design wavelength(s), may, for example, be utilized in integrating nanostructures having the determined corporeal aspects upon an optical substrate to provide an embodiments of single nanostructure-integrated metalens 110 in accordance with concepts herein. For example, techniques such as photolithography, soft lithography, laser ablation, chemical self-assembly, roll-to-roll nanoimprinting, etc. may be utilized in integrating nanostructures providing phase distribution according to the predetermined mapping which satisfies the determined phase map(s) and having the determined corporeal aspects with an optical substrate to provide an instance of single nanostructure-integrated metalens 110. As a specific example for light focusing of a single wavelength having an NIR center wavelength (e.g., $\lambda_c$=940 nm), nanostructures comprised of silicon (e.g., n=3.71 for $\lambda_c$ of 940 nm) may be integrated on an optical glass substrate according to a phase distribution of a single phase map determined with respect to the single design wavelength (e.g., $\lambda_1$=$\lambda_c$=940 nm) and having a height of 490 nm (e.g., H=490 nm), a period distance of 500 nm (e.g., P=400 nm) maintained with respect to adjacent nanostructures, and implementing 8 quantized lateral sizes (e.g., $S_1$43 π/4, $S_2$→π/2, $S_3$→3π/4, $S_4$→π, $S_5$→5π/4, $S_6$→3π/2, $S_7$→7π/4, and $S_8$→2π), for use as a single nanostructure-integrated metalens configuration to be utilized in an optical sensor device for IR imaging applications (e.g., 3D sensing systems, security imaging systems, gas analysis systems, thermal camera systems, etc.). Additionally, as a specific example for light focusing of a plurality of wavelengths having an LWIR center wavelength (e.g., $\lambda_c$=10 μm), nanostructures comprised of silicon (e.g., n=3.4 for $\lambda_c$ of 10 μm) may be integrated on a silicon substrate according to a phase distribution which satisfies three phase maps each determined with respect one of three design wavelengths (e.g., $\lambda_1$=9 μm, $\lambda_2$==10 μm, $\lambda_1$=11 μm) and having a height of 5 μm (e.g., H=5 μm), a period distance of 4 μm (e.g., P=4 μm) maintained with respect to adjacent nanostructures, and implementing 8 quantized lateral sizes (e.g., $S_1$→π/4, $S_2$→π/2, $S_3$→3π/4, $S_4$→π, $S_5$→5π/4, $S_6$→3π/2, $S_7$→7π/4, and $S_8$→2π), for use as a single nanostructure-integrated metalens configuration to be utilized in an optical sensor device for IR imaging applications (e.g., 3D sensing systems, security imaging systems, gas analysis systems, thermal camera systems, etc.).

FIG. 5 provides a detailed illustration of an optical sensor device 500 that incorporates an instance of single nanostructure-integrated metalens 110 configured to provide light focusing functionality for light having one or more wavelength(s) using corporeal aspects and a preconfigured mapping determined according to the operations of embodiments of flow 200 in accordance with concepts of the invention. The instance of single nanostructure-integrated metalens 110 may, for example, be oriented with nanostructures 112 integrated on a side of optical substrate 111 facing sensor array 120, and having support structure 130 position the lens plane of single nanostructure-integrated metalens 110 a distance 510 from the image detection plane of sensor array 120 corresponding to the focal distance of a light focusing function of the single nanostructure-integrated metalens 110 (e.g., a distance selected from within a range of focal distances spanning between the smallest focal distance associated with a light focusing phase map corresponding to a design wavelength $\lambda_n$ of single nanostructure-integrated metalens 110 and the largest focal distance associated with a light focusing phase map corresponding to a design wavelength $\lambda_n$ of single nanostructure-integrated metalens 110). Further, support structure 130 may be adjustable to reposition single nanostructure-integrated metalens 110 to one or more distance(s) different from distance 510 (e.g., a second distance selected from within a range of focal distances spanning between the smallest focal distance associated with a light focusing phase map corresponding to a design wavelength $\lambda_n$ of single nanostructure-integrated metalens 110 and the largest focal distance associated with a light focusing phase map corresponding to a design wavelength $\lambda_n$ of single nanostructure-integrated metalens 110). Support structure 130 may include an aperture 520 through which light rays 530 may enter support structure 130. Support structure 130 may be configured such that light rays 530 entering through aperture 520 must pass through single nanostructure-integrated metalens 110 before reaching the image detection plane of sensor array 120. Accordingly, single nanostructure-integrated metalens 110 may focus particular wavelengths (e.g. wavelengths from within the effective light focusing bandwidth of single nanostructure-integrated metalens 110) of light rays 530, in accordance with a preconfigured mapping implemented via nanostructures 112, into focused points of light 540 on the image detection plane of sensor array 120 corresponding to the pixel locations of sensor 120. The resulting instance of optical sensor device 500 may, for example, be utilized for imaging applications (e.g., applications imaging the IR spectrum such as 3D sensing systems, security imaging systems, gas analysis systems, thermal camera systems, etc.) and may support higher quality imaging over wideband wavelength ranges (e.g., wideband IR wavelength ranges) while utilizing no additional optical elements (e.g., additional metalens (es), traditional lens(es), collimator(s), concentrator(s), mirror(s), etc.) in association with single nanostructure-integrated metalens 110, facilitating a short total track length with respect to the apparatus and a lower number and cost of components in the apparatus.

In some embodiments, optical sensor device 500 may also include a bandpass filtering layer 550 deposited on the surface of single nanostructure-integrated metalens 110 oriented facing away from the image detection plane of sensor array 120. Bandpass filtering layer 550 may be configured to attenuate light having wavelengths k a such that k a comprises wavelengths outside the effective light focusing bandwidth of single nanostructure-integrated metalens 110 (e.g., $\lambda_a \leq (\lambda_{min}*0.9)$ and $\lambda_a \geq (\lambda_{max}*1.1)$ wherein $\lambda_{min}$ is the smallest wavelength of $\lambda_n$ and $\lambda_{max}$ is the largest wavelength of $\lambda_n$). $\lambda_a$ may include all wavelengths outside the effective light focusing bandwidth of single nanostructure-integrated metalens 110 or only a subset of wavelengths outside the effective light focusing bandwidth of single nanostructure-integrated metalens 110. Embodiments of optical sensor device 500 including a bandpass filtering layer 550 may be desirable in instances wherein the range of wavelengths for which sensor array 120 detects light (i.e., imaging bandwidth) encompasses wavelengths beyond the desired range of wavelengths to be imaged.

Some embodiments of optical sensor devices configured for light focusing functionality, such as optical sensor device 500 illustrated in FIG. 5, comprise a metalens configuration including no more than one metalens structure (e.g., single nanostructure-integrated metalens 110) and no additional optical elements (e.g., additional metalens(es), traditional lens(es), collimator(s), concentrator(s), mirror(s), etc.). In other embodiments of optical sensor devices configured for light focusing functionality, an optical sensor device may comprise a metalens configuration including one or more lens structure(s) (e.g., additional metalens(es), traditional lens(es), etc.). For example, in an embodiment of an optical sensor device having a support structure including an aperture for entering light rays, similar to aperture 520, may include a protective lens held by the support structure so as to completely cover the aperture. The aperture may be positioned on an outermost surface of the support structure such that a surface of the protective lens oriented facing away from the interior of the support structure and the contents inside (e.g., a nanostructure-integrated metalens) contacts free space external to the support structure. The protective lens may be positioned in the support structure such that light passing through the protective lens must first pass through at least one nanostructure-integrated metalens before reaching the image detection plane of a sensor array of the optical sensor device. Additionally, a surface of the protective lens oriented facing toward the image detection plane of a sensor array of the optical sensor device may include a plurality of nanostructures integrated thereon.

Further, some embodiments of optical sensor devices configured for light focusing functionality having more than one lens structure may include a support structure adjustable to alter the distance(s) separating the more than one lens structures. For example, an embodiment of an optical sensor device having two nanostructure-integrated metalenses may include a support structure holding the two nanostructure-integrated metalenses as well as a sensor array such that light passing through the support structure must pass through both nanostructure-integrated metalenses before reaching the image detection plane of the sensor array. In the above-described embodiment, the two metalenses may be separated by a first distance, the metalens nearer the sensor array may be separated from the sensor array by a second distance, and the support structure may be adjustable to alter the distance separating the two metalenses. Additionally, in some embodiments, one or more of the nanostructure-integrated metalenses included in an optical sensor device may feature nanostructures on both faces of the metalens (es).

Although embodiments herein are predominantly described with reference to IR imaging systems, one of ordinary skill in the art will readily appreciate that concepts described herein may be utilized in other implementations. For example, some single nanostructure-integrated metalens embodiments configured to focus light having wavelengths from within a range of visual spectrum wavelengths may be included in optical sensor devices used for visual spectrum optical applications (e.g., mobile device cameras, visual spectrum laser systems, visual telescope systems, spectroscopy analysis systems, etc.). As another example, some single nanostructure-integrated metalens embodiments configured to focus light having wavelengths from within a range of UV spectrum wavelengths may be included in optical sensor devices used for UV spectrum optical applications (e.g., UV spectrum camera systems, UV spectrum laser systems, UV telescope systems, spectroscopy analysis systems, etc.).

Additionally, although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A metalens comprising:
   an optical substrate having a transparent spectral range of at least 50 nm encompassing a center wavelength of a device to be used with the metalens; and
   a plurality of nanostructures integrated on a first surface of the optical substrate in accordance with a phase distribution of a preconfigured mapping, wherein the nanostructures are provided in at least 8 quantized lateral sizes and are spaced according to a period distance (P), wherein P is in a range from $(\lambda_c{*}0.8)/2$ to $\lambda_c{*}1.2)/2$, and wherein $\lambda_c$ is a center wavelength of an operation wavelength region of the metalens.

2. The metalens of claim 1, wherein the preconfigured mapping satisfies a plurality of phase maps configured for light focusing functionality corresponding to a plurality of design wavelengths $\lambda_n$ from within a range from 780 nm to 14 μm, wherein n is a sequence of at least two positive integers, and wherein $\lambda_c$ is the centermost wavelength of a range of wavelengths spanning between the smallest wavelength and the largest wavelength of the plurality of design wavelengths $\lambda_n$.

3. The metalens of claim 2, wherein the plurality of phase maps corresponding to the plurality of $\lambda_n$ are associated with a plurality of design focal distances $f_n$, wherein $\lambda_c$ is associated with a center focal distance $f_c$, and wherein the plurality of $f_n$ satisfy $0.95 \leq f_n/f_c \leq 1.05$.

4. The metalens of claim 2, wherein the plurality of design wavelengths $\lambda_n$ are chosen from within a range from 8 μm to 14 μm.

5. The metalens of claim 1, wherein the preconfigured mapping provides for light focusing of light rays incident on a second surface of the optical substrate opposite the first surface within a field of view of no less than 10° and no greater than 90°.

6. The metalens of claim 1, wherein the plurality of nanostructures each have a same height (H), and wherein H is in a range from $\lambda_c/10$ to $\lambda_c$.

7. The metalens of claim 1, wherein the plurality of nanostructures comprise a material having a refractive index with respect to the operation wavelength region of the metalens not smaller than 1.5.

8. The metalens of claim 1, wherein the plurality of nanostructures comprise a plasmonic metallic material including gold (Au), silver (Ag), platinum (Pt), palladium (Pd), or a combination thereof.

9. The metalens of claim 1, wherein the nanostructures are provided in 8 quantized lateral sizes corresponding to 8 levels of phase change, wherein the 8 levels of phase change correspond to phase changes of $\pi/4$, $\pi/2$, $3\pi/4$, $\pi$, $5\pi/4$, $3\pi/2$, $7\pi/4$, and $2\pi$, and wherein the nanostructures are configured to have a same spatial resolution in x and y axes.

10. An apparatus comprising:
    at least one optical sensor device comprising:
       a single nanostructure-integrated metalens, wherein the single nanostructure-integrated metalens comprises:
          an optical substrate having a transparent spectral range of at least 50 nm encompassing a center wavelength of a sensor array to be used with the metalens; and
          a plurality of nanostructures integrated on at least one surface of the optical substrate in accordance with a phase distribution of a preconfigured mapping configured to focus light incident on the single nanostructure-integrated metalens, wherein the nanostructures are provided in at least 8 quantized lateral sizes and are spaced according to a period distance (P), wherein P is in a range from $(\lambda_c{*}0.8)/2$ to $(\lambda_c{*}1.2)/2$, and wherein 2 is a center wavelength of an operation wavelength region of the metalens;
       the sensor array, wherein the sensor array includes a matrix of pixels arranged in an image detection plane configured for imaging, and wherein the pixels are configured to detect light having wavelengths from within a detection range of wavelengths encompassing the center wavelength $\lambda_c$; and
       a support structure configured to hold the single nanostructure-integrated metalens in a desired predetermined relationship with the image detection plane of the sensor array, wherein the predetermined relationship is configured such that the single nanostructure-integrated metalens focuses light incident on a first surface of the single nanostructure-integrated metalens onto the matrix of pixels, and wherein the support structure is configured to hold the single nanostructure-integrated metalens oriented in the support structure so that a second surface of the single nanostructure-integrated metalens having nanostructures of the plurality of nanostructures integrated thereon faces the image detection plane of the sensor array.

11. The apparatus of claim 10, wherein the preconfigured mapping satisfies a plurality of phase maps configured for light focusing functionality corresponding to a plurality of design wavelengths $\lambda_n$ from within a range from 780 nm to 14 μm, wherein n is a sequence of at least two positive integers, and wherein $\lambda_c$ is the centermost wavelength of a range of wavelengths spanning between the smallest wavelength and the largest wavelength of the plurality of design wavelengths $\lambda_n$.

12. The apparatus of claim 11, wherein the plurality of phase maps corresponding to the plurality of $\lambda_n$ are associated with a plurality of design focal distances $f_n$, wherein $\lambda_c$ is associated with a center focal distance $f_c$, and wherein the plurality of $f_n$ satisfy $0.95 \leq f_n/f_c \leq 1.05$.

13. The apparatus of claim 12, wherein the predetermined relationship positions the single nanostructure-integrated metalens at a first distance away from the image detection plane, wherein the first distance is encompassed within a range of distances spanning between the smallest design focal distance and the largest design focal distance of the plurality of $f_n$.

14. The apparatus of claim 13, wherein the support structure is adjustable to reposition the single nanostructure-integrated metalens from the first distance away from the image detection plane to a second distance away from the image detection plane different from the first distance, wherein the second distance is encompassed within the range of distances spanning between the smallest design focal distance and the largest design focal distance of the plurality of $f_n$.

15. The apparatus of claim 10, wherein the entirety of the plurality of nanostructures is integrated on the second surface of the single nanostructure-integrated metalens.

16. The apparatus of claim 11, wherein the apparatus is configured such that the single nanostructure-integrated metalens focuses light incident on the first surface of the single nanostructure-integrated metalens into an illuminated region on the image detection plane no larger than 13.2 mm by 8.8 mm.

17. The apparatus of claim 11, further comprising a bandpass filtering layer deposited on the first surface of the single nanostructure-integrated metalens, wherein the bandpass filtering layer attenuates light having wavelength $\lambda_a$ such that $\lambda_a \leq (\lambda_{min}*0.9)$ and $\lambda_a \geq (\lambda_{max}*1.1)$, and wherein $\lambda_{min}$ is the smallest wavelength of $\lambda_n$ and $\lambda_{max}$ is the largest wavelength of $\lambda_n$.

18. An apparatus comprising:

at least one optical sensor device comprising:

one or more lenses including at least one nanostructure-integrated metalens, wherein the at least one nanostructure-integrated metalens comprises:

an optical substrate having a transparent spectral range of at least 50 nm encompassing a center wavelength of a sensor array to be used with the metalens; and a plurality of nanostructures integrated on at least one surface of the optical substrate in accordance with a phase distribution of a preconfigured mapping configured to focus light incident on the at least one nanostructure-integrated metalens, wherein the nanostructures are provided in at least 8 quantized lateral sizes and are spaced according to a period distance (P), wherein P is in a range from $(\lambda_c*0.8)/2$ to $(\lambda_c*1.2)/2$, and wherein $\lambda_c$ is a center wavelength of an operation wavelength region of the metalens;

the sensor array, wherein the sensor array includes a matrix of pixels arranged in an image detection plane configured for imaging, wherein the pixels are configured to detect light having wavelengths from within a detection range of wavelengths encompassing the center wavelength $\lambda_c$;

a support structure configured to hold the at least one nanostructure-integrated metalens in a desired predetermined relationship with the image detection plane of the sensor array, wherein the predetermined relationship is configured such that the at least one nanostructure-integrated metalens focuses light incident on a first surface of the at least one nanostructure-integrated metalens onto the matrix of pixels, and wherein the support structure is configured to hold the at least one nanostructure-integrated metalens oriented in the support structure so that a second surface of the at least one nanostructure-integrated metalens having nanostructures of the plurality of nanostructures integrated thereon faces the image detection plane of the sensor array; and a protective lens, wherein the protective lens is positioned withing the support structure such that light passing through the protective lens must first pass through the at least one nanostructure-integrated metalens before reaching the image detection plane of the sensor array, and wherein a first surface of the protective lens orientated facing away from the at least one nanostructure-integrated metalens contacts free space external to the support structure.

19. The apparatus of claim 18, wherein the protective lens includes, integrated onto a second surface of the protective lens orientated facing toward the at least one nanostructure-integrated metalens, a second plurality of nanostructures.

20. The apparatus of claim 18, wherein the support structure is configured to hold a second lens in addition to the at least one nanostructure-integrated metalens, wherein the second lens is positioned such that light illuminating the image detection plane of the sensor array must pass through both the second lens and the at least one nanostructure-integrated metalens before reaching the image detection plane of the sensor array, and wherein the support structure is adjustable to alter the distance separating the second lens and the at least one nanostructure-integrated metalens.

* * * * *